US006909211B2

(12) United States Patent
Ciciliani et al.

(10) Patent No.: US 6,909,211 B2
(45) Date of Patent: Jun. 21, 2005

(54) ROTARY ELECTRIC MACHINE WITH FORCED VENTILATION

(75) Inventors: Philippe Ciciliani, Valentigney (FR); Arnaud Lhote, Etupes (FR); Hong-Hai Duong, Joncherey (FR)

(73) Assignee: Moteurs Leroy-Somer, Angouleme (FR)

( * ) Notice: Subject to any disclaimer, the term of this patent is extended or adjusted under 35 U.S.C. 154(b) by 0 days.

(21) Appl. No.: 10/395,139

(22) Filed: Mar. 25, 2003

(65) Prior Publication Data

US 2004/0000821 A1 Jan. 1, 2004

(30) Foreign Application Priority Data

Apr. 3, 2002 (FR) .............................. 02 04138

(51) Int. Cl.[7] .............................. H02K 1/20; H02K 5/20
(52) U.S. Cl. .......................... 310/58; 310/89; 310/216; 310/258
(58) Field of Search .......................... 310/89, 216–217, 310/208, 258, 52, 58–59, 60 R, 60 A (56) References Cited

U.S. PATENT DOCUMENTS

| | | | | | |
|---|---|---|---|---|---|
| 2,818,515 | A | * | 12/1957 | Dolenc ........................ | 310/57 |
| 3,748,507 | A | * | 7/1973 | Sieber ........................ | 310/58 |
| 3,783,318 | A | * | 1/1974 | Widstrand .................. | 310/216 |
| 4,352,034 | A | * | 9/1982 | Karhan et al. ................ | 310/59 |
| 4,399,382 | A | * | 8/1983 | Volkrodt .................... | 310/216 |
| 4,406,959 | A | * | 9/1983 | Harano et al. ................ | 310/58 |
| 4,492,888 | A | * | 1/1985 | Peachee et al. .............. | 310/71 |
| 4,528,469 | A | * | 7/1985 | Prenner et al. .............. | 310/59 |
| 4,658,169 | A | * | 4/1987 | Eckerrot et al. ............ | 310/208 |
| 4,912,350 | A | * | 3/1990 | Parshall et al. ............. | 310/217 |
| 5,062,330 | A | | 11/1991 | Trautmann et al. .......... | 82/147 |
| 5,747,900 | A | * | 5/1998 | Nakamura et al. ............ | 310/58 |

FOREIGN PATENT DOCUMENTS

| | | | | |
|---|---|---|---|---|
| DE | 29 28 027 | | 1/1981 | ............ H02K/9/00 |
| DE | 43 37 463 A1 | | 5/1995 | ............ H02K/1/20 |
| EP | 0 072 999 | | 8/1982 | ............ H02K/9/14 |
| EP | 1 005 139 A2 | | 5/2000 | ............ H02K/9/04 |
| GB | 2 331 859 A | | 6/1999 | |
| JP | A-61-42264 | | 2/1986 | .......... H02K/4/025 |
| WO | WO 90/13936 | | 11/1990 | ............ H02K/5/18 |
| WO | WO 97/40569 | | 10/1997 | ............ H02K/5/18 |

OTHER PUBLICATIONS

W. Hartmann et al., "Universelles Beluftungssystem fur die neue Generation VEM–Drehstrom–Hauptantriebe" ELEKTRIE, 1993, pp 465–469.

* cited by examiner

Primary Examiner—Burton Mullins
(74) Attorney, Agent, or Firm—Oliff & Berridge, PLC (57) ABSTRACT

The present invention provides an electric machine with forced ventilation, the machine comprising:
- a rotor capable of rotating about an axis of rotation;
- a stator within which the rotor can rotate, said stator comprising a stack of laminations presenting slots housing windings; and
- a fan, in particular a fan that is capable of rotating independently of the rotor;
- the laminations being configured to form cooling channels in which a stream of cooling air generated by the fan can flow, and the stack being disposed between two spacers interconnected by bars.

20 Claims, 8 Drawing Sheets

FIG.1
PRIOR ART

FIG_2

FIG_7

FIG_6

PRIOR ART

ROTARY ELECTRIC MACHINE WITH FORCED VENTILATION

The present invention relates to electric machines with forced ventilation, such a machine comprising a stator having cooling fins and using a fan to generate a flow of air over the fins in order to evacuate the heat given off by the machine in operation.

BACKGROUND OF THE INVENTION

JP 610422 64 discloses a linear motor having copper or aluminum fins for dissipating heat.

WO 97/40569 discloses a variety of rotary machine casings having cooling fins. FIG. 1 of WO 97/40569 shows a casing provided with splines parallel to the axis of rotation of the rotor, the machine having forced ventilation. FIG. 2 shows a casing provided with fins perpendicular to the axis of rotation, for providing cooling by natural convection.

Application EP 0 072 999 describes a rotary machine having fins extending parallel to its axis of rotation, inside a casing.

Other air-cooled electric machines are known from WO 90/13936.

Figure 1:
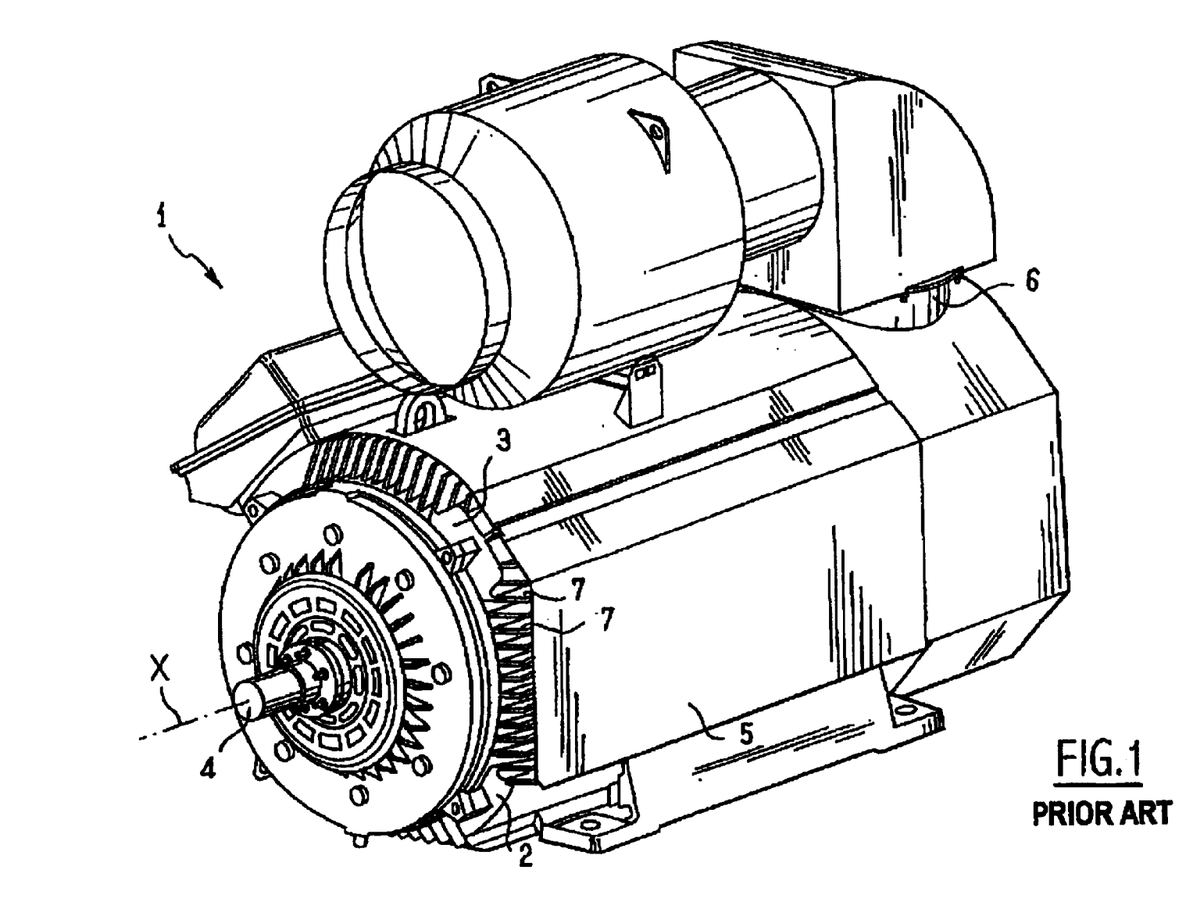
FIG. 1, described above, is a diagrammatic perspective view of a prior art machine.

FIG. 1 of the accompanying drawings is a diagrammatic perspective view of another known machine 1 comprising a stator 2 including a casing 3 made of cast iron with fins 7 extending parallel to the axis of rotation X of the rotor 4. The casing 3 is covered by a cover 5 serving to channel air between the fins 7. A fan 6 (with only the casing of the fan being visible) is fixed to the cover 5 of the machine, on top and at one end thereof, air being sucked in through the other end. In addition to the casing 3, the stator 2 also includes a magnetic circuit (not shown) made up of a stack of laminations having slots that receive stator windings.

OBJECTS AND SUMMARY OF THE INVENTION

There exists a need to improve such a machine, and in particular to reduce its manufacturing cost and/or to increase its performance.

In one of its aspects, the present invention provides an electric machine with forced ventilation, the machine comprising:

- a rotor capable of rotating about an axis of rotation;
- a stator within which the rotor can rotate, said stator comprising a stack of laminations presenting slots housing windings; and
- a fan, in particular a fan that is capable of rotating independently of the rotor;

wherein the laminations are configured to form cooling channels in which a stream of cooling air generated by the fan can flow, and wherein the stack is disposed between two spacers interconnected by bars.

By making the cooling channels out of the stack of laminations, it is possible to avoid: providing a cast metal casing; machining the casing; and securing the stack of laminations inside it.

The absence of a casing makes it possible to further improve the evacuation of heat by conduction by eliminating the thermal resistance that occurs in prior art machines between the magnetic circuit and the casing.

The stack of laminations may be configured to form fins that extend substantially perpendicular to the axis of rotation of the rotor. Fins having this disposition serve to cool the machine effectively. In addition, the fins can be made much closer together than is possible by casting. By using the stack of laminations, it is thus possible to make a large number of fins, for example about fifty. By way of example, each fin may be formed by a packet of two to twelve laminations, and in particular of five to nine laminations, e.g. seven laminations. Finally, when the fins are made out of magnetic lamination material, they can also serve to improve the condition of magnetic flux.

The fan may be supported by the machine, e.g. substantially halfway along it. The machine may have a cover covering the fins at least in part, with cooling channels being formed between the fins, the cover serving to channel air between the fins. The cover may be fixed on the spacers, for example.

The machine may include two partitions substantially perpendicular to the axis of rotation and disposed inside the cover, e.g. forming an integral portion of the cover. The cover may have two air inlets outside the partitions and an air outlet between the two partitions, the two inlets and the outlet possibly being situated on the top of the machine, with the partitions being configured to constrain air to flow from the inlets towards the outlets via passages situated under the machine.

The stack of laminations may comprise alternating packets of laminations, with the laminations in each packet all being identical in shape, while the laminations in two consecutive packets are of different shapes. One of the packets may thus comprise laminations of outline that is substantially circular, while the adjacent packet may comprise laminations having additional extensions for building up the fins.

The spacers may support endplates carrying the shaft of the rotor.

The bars may be fixed to the spacers, e.g. by welding, so as to maintain the stack under axial compression.

Each spacer may comprise a generally tubular body having one end adjacent to one of the ends of the stack and an opposite end adjacent to a flange welded to the body, said flange serving to fix the corresponding endplate. The spacers may have tabs enabling the machine to be fixed in place.

The stator windings may have heads formed by bundles of wires leaving one slot in order to engage in another. These winding heads may be generally triangular in section, thus enabling the spacers to be connected together by bars that are rectilinear, extending parallel to the axis of rotation of the rotor, and fixed to the outside surfaces of the spacer bodies. The generally triangular shape of the winding heads enables them to be disposed inside the body of a spacer while occupying sufficiently little radial space to enable the rotor to be inserted easily into the stator, thus avoiding any need to apply mechanical compression to the coils which might damage the electrical installation of the wires.

The invention is particularly suitable for making electric machines of power greater than or equal to 500 kilowatts (kW), and in particular for making wind-turbine generators having a power rating of 850 kW or more.

The invention also provides a wind turbine fitted with a machine as defined above.

BRIEF DESCRIPTION OF THE DRAWINGS

The invention will be better understood on reading the following detailed description of non-limiting embodiments, and on examining the accompanying drawings, in which.

MORE DETAILED DESCRIPTION

Figure 2:
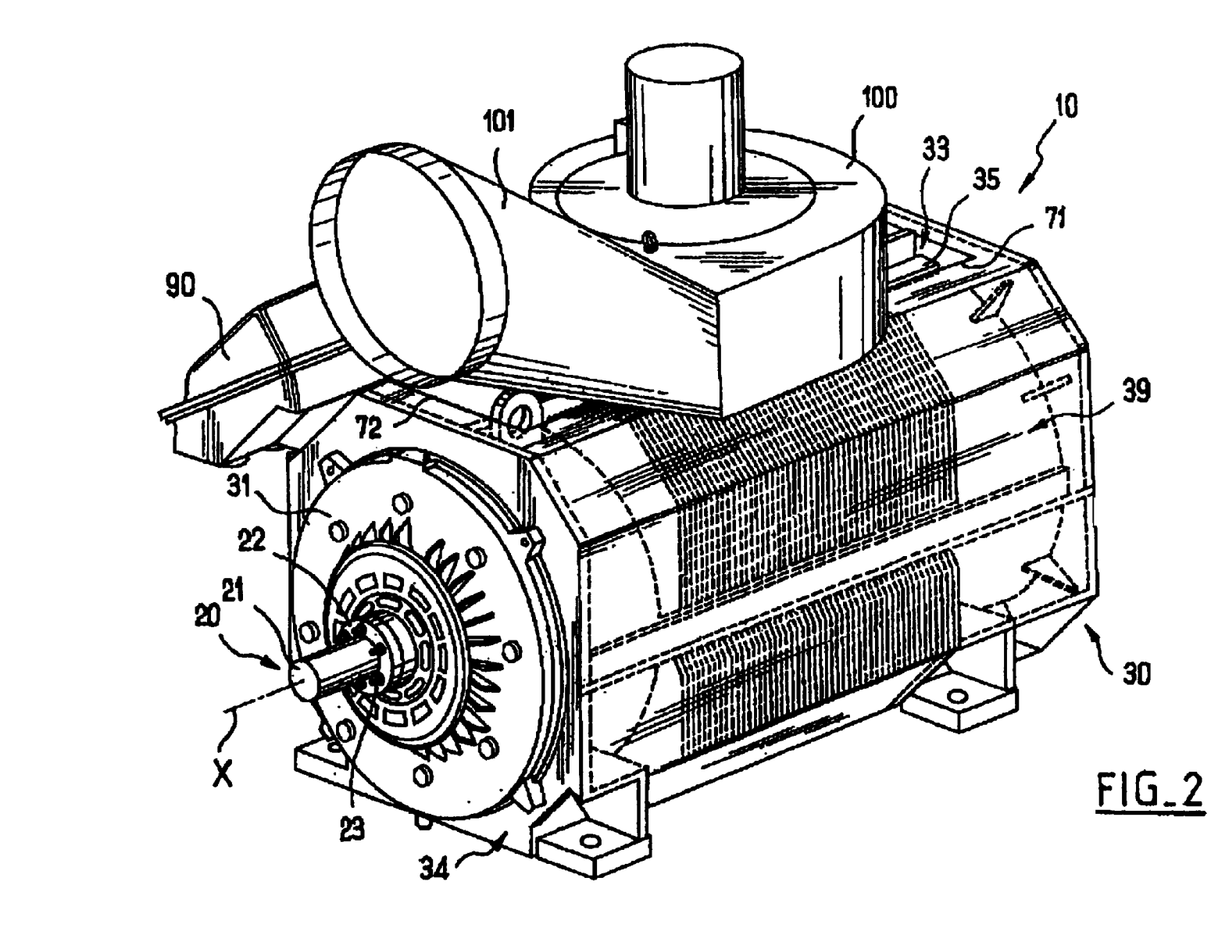
FIG. 2 is a diagrammatic perspective view of a machine implementing at least some aspects of the invention.

The machine 10 shown in FIG. 2 comprises a rotor 20 mounted to rotate inside a stator 30 about an axis of rotation X.

The machine is designed, for example, for fitting to the pod of a V52–850 kW type wind turbine as sold by the Danish supplier Vestas.

The rotor 20 carries coils and its shaft 21 has an insulating ring 22 at the front end of the machine supporting connectors 23 for electrical connection to the windings.

The shaft 21 is supported by ball bearings fixed to endplates 31 of the stator 30, with only one of the endplates being visible in FIG. 2.

Figures 3, 4:
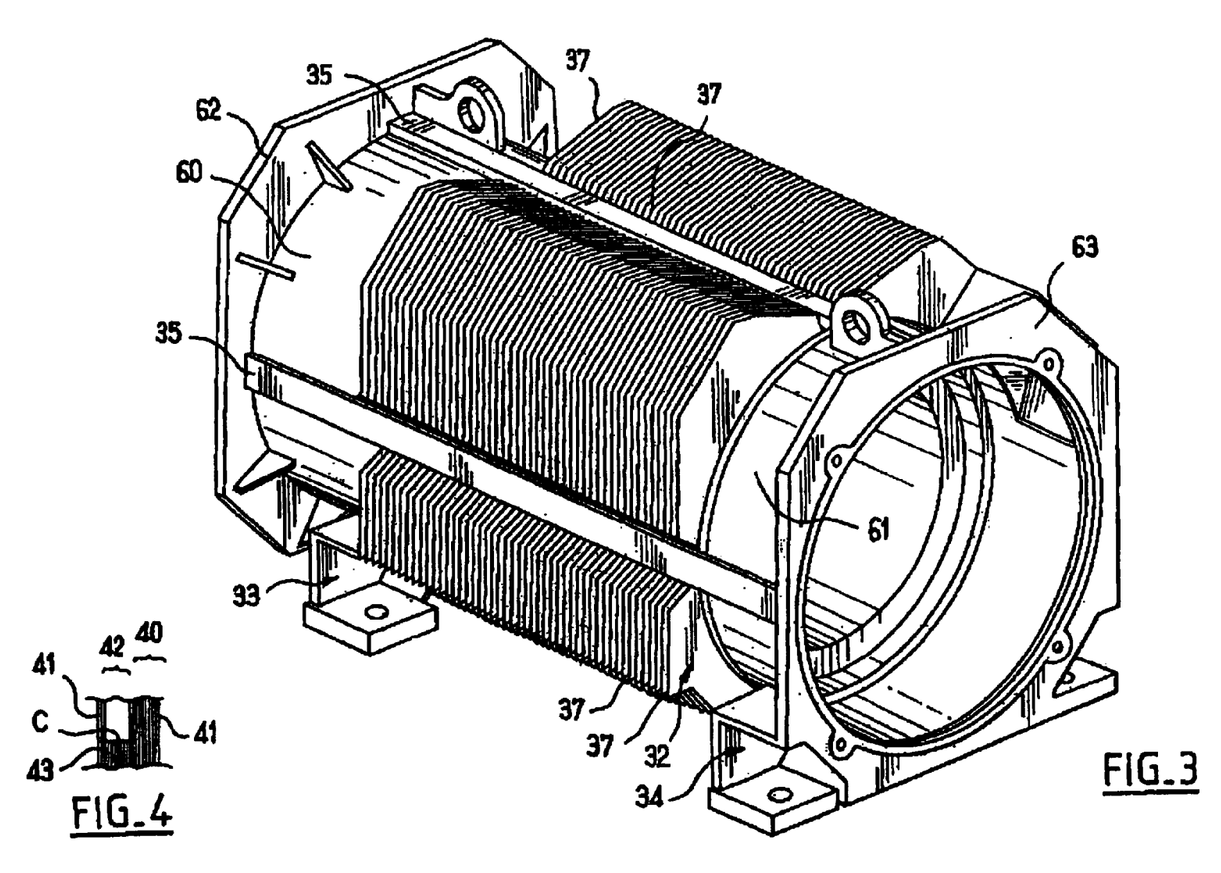
FIG. 3 is a diagrammatic perspective view of the stack of laminations, the spacers, and the bars interconnecting them.
FIG. 4 is a fragmentary side view of the stack of laminations.

As can be seen more particularly in FIG. 3, the stator 30 comprises a stack 32 of stator laminations disposed between two spacers 33 and 34 interconnected by four bars 35.

The stack 32 comprises a succession of packets 40, e.g. about fifty packets, each made up of a plurality of identical magnetic steel laminations 41 placed one against another, alternating with packets 42 each made up of a plurality of identical magnetic steel laminations 43 also placed one against another. The stator laminations 41 and 43 are of different shapes, such that the packets 40 alternating with the packets 42 form cooling fins 37.

In the example shown, each packet 40 or 42 comprises seven laminations 41 or 43 as the case may be, which laminations are all identical within any one packet, as can be seen in FIG. 4.

Figure 5:
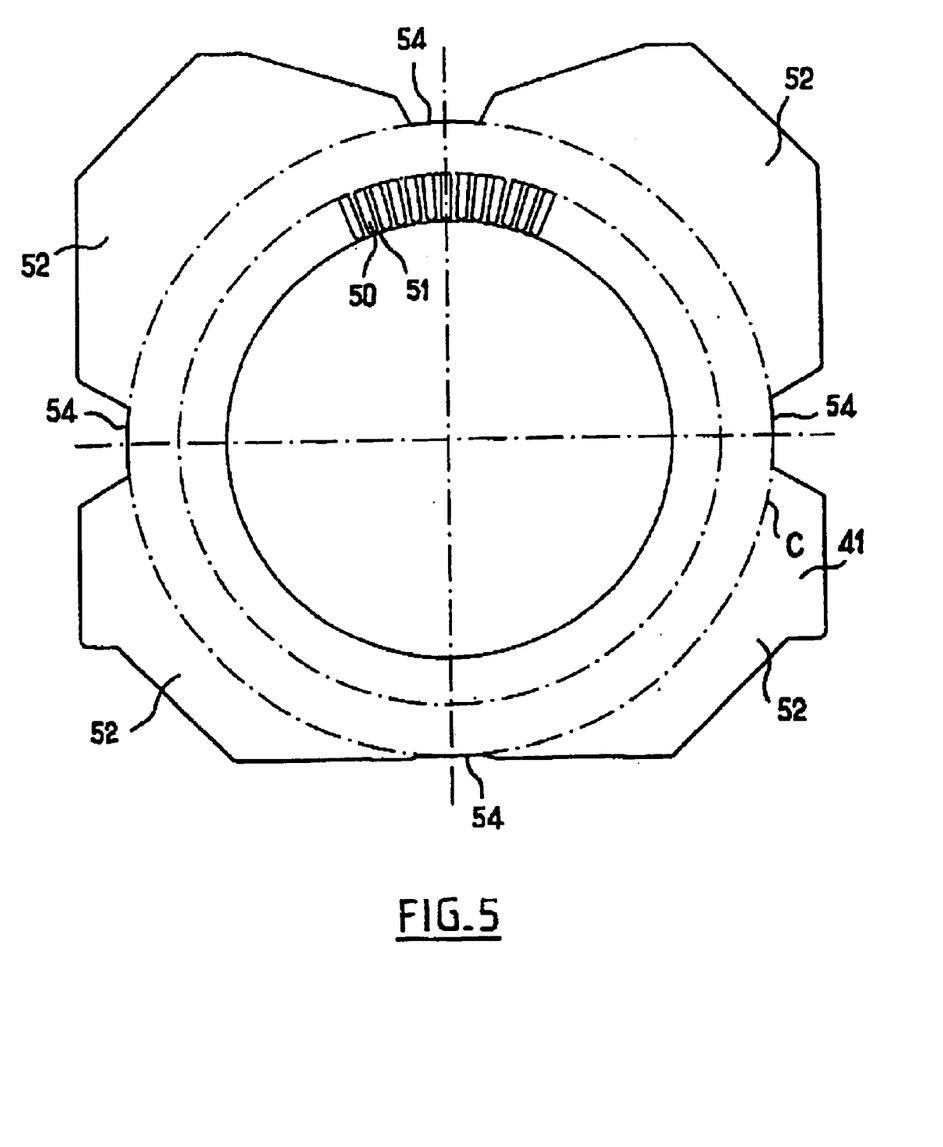
FIG. 5 is a front view of a stator lamination.

FIG. 5 shows a lamination 41. This lamination is made by being cut out from sheet material and it includes notches 50 in its radially inner edge, e.g. ninety-six notches formed between teeth 51. In the example shown, the notches 50 have flared poles and they are configured to make up slots for receiving the wires of the windings of the stator 30, which wires are circular in section, for example.

Chain-dotted line C represents the general outline of the laminations 43. It can be observed that on its outside edge the lamination 41 carries four extensions 52 that serve to form fins 37. Grooves 54 are formed between the extensions 52 for passing the bars 35 that connect together the spacers 33 and 34, each of these bars 35 being rectilinear with a longitudinal axis parallel to the axis of rotation X.

When the stack 32 is observed along the axis of rotation X, the bottoms of the grooves 54 come into alignment with the outline C of the laminations 43.

On examining FIG. 3, it can also be observed that the spacers 33 and 34 comprise respective generally cylindrical bodies 60 and 61 having respective flanges 62 and 63 fixed thereto for supporting the endplates 31.

The bodies 60 and 61 present cylindrical outside surfaces that are in alignment with the bottoms of the grooves 54, thus making it easy to fix the bars 35 thereto, e.g. by welding.

Returning to FIG. 2, it can be seen that the stator 30 includes a cover 39 that covers the stack 32 and the bodies 60 and 61 of the spacers. In the example shown, this cover 39 is fixed to the narrow edge faces of the flanges 62 and 63.

Figure 6:
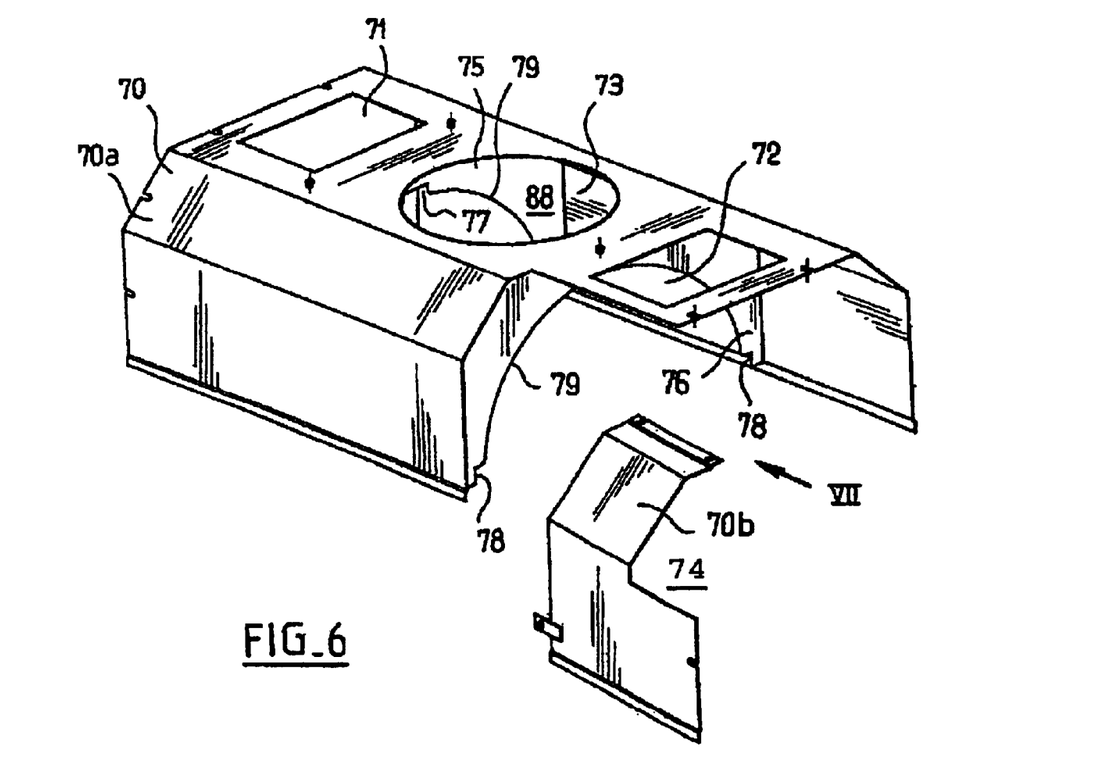
FIG. 6 is a perspective view of the top portion of the cover of the machine shown in FIG. 2.
Figure 7:
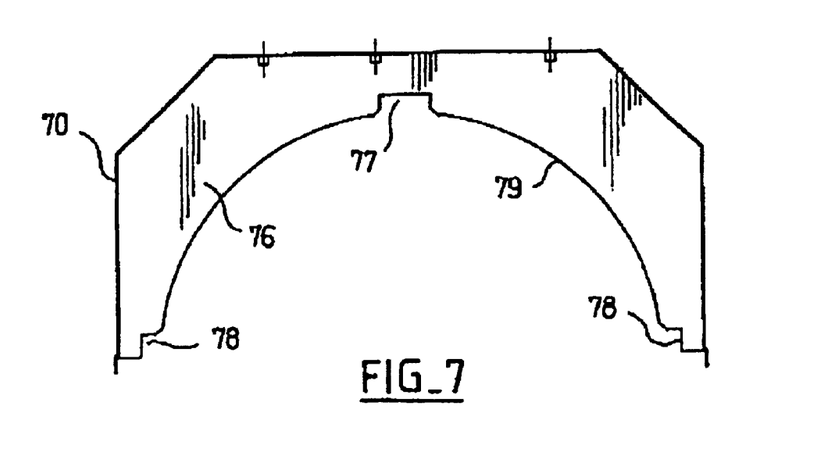
FIG. 7 is a front view of FIG. 6 seen looking along arrow VII.
Figure 8:
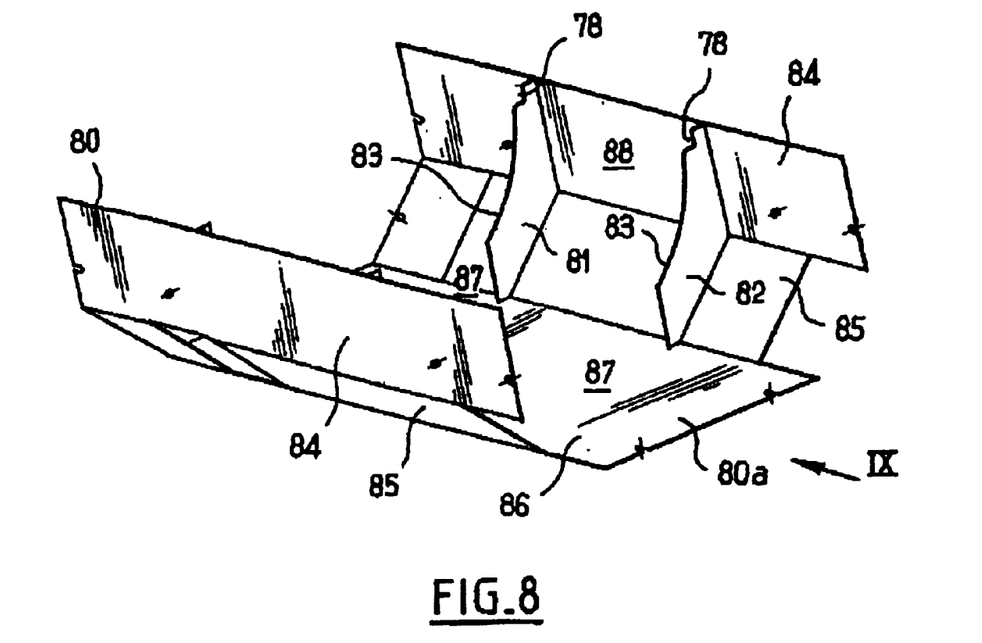
FIG. 8 is a perspective view of the bottom portion of the machine cover.
Figure 9:
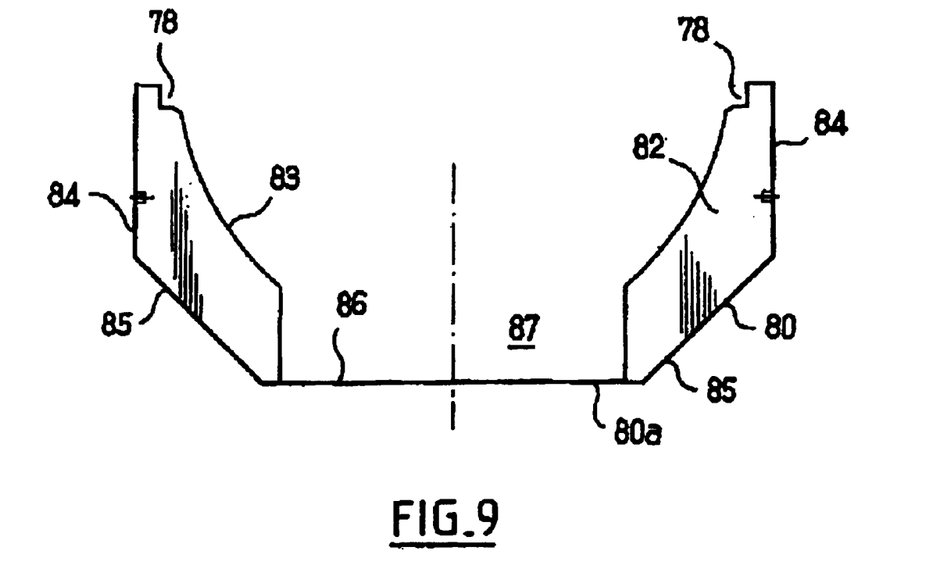
FIG. 9 is a front view looking along arrow IX of FIG. 8.

The cover 39 comprises a top portion 70 shown on its own in FIGS. 6 and 7, and a bottom portion 80, shown on its own in FIGS. 8 and 9.

The top portion 70 comprises a metal sheet 70a with a removable element 70b presenting an opening 74 for fixing a connection box 90. The sheet 70a is pierced by two holes 71 and 72 for admitting cooling air, as described below, and a central hole 73 situated between the holes 71 and 72 for exhausting hot air that is to be evacuated.

The top portion 70 also has parallel partitions 75 and 76 extending perpendicularly to the axis X and presenting a generally semi-circular free edge 79 for bearing against a packet 42 of laminations 43.

The free edge 79 includes notches 77 for passing the top bar 35 and half-notches 78 for passing the side bars 35.

The bottom portion 80 comprises a metal sheet 80a having vertical panels 84 and sloping panels 85 interconnected by a bottom panel 86.

Parallel partitions 81 and 82 perpendicular to the axis X are fixed to the sheet 80a, each presenting a free edge 83 for bearing against a packet 42 of laminations 43 in line with the partitions 75 and 76 respectively, and half-notches 78 for passing the side bars 35.

The partitions 81 and 82 extend along the vertical and sloping panels 84 and 85, but extend very little over the bottom panel 86, thereby creating passages 87.

Taken together, the partitions 75 & 81 and 76 & 82 form a compartment 88 into which the central opening 73 opens out.

The cooling air is set into motion by means of a fan 100, with only its casing being visible, which fan is fixed to the top portion 70 of the cover 39 substantially halfway along the machine, and is connected to a duct 101 for delivering the air that is to be evacuated to the front end of the machine 10.

The cool air entering via the openings 71 and 72 flows vertically along the fins 37 outside the compartment 88 until it reaches the bottom panel 86, and then passes horizontally through the passages 87 prior to rising through the compartment 88 so as to pass out through the opening 73.

Figure 10:
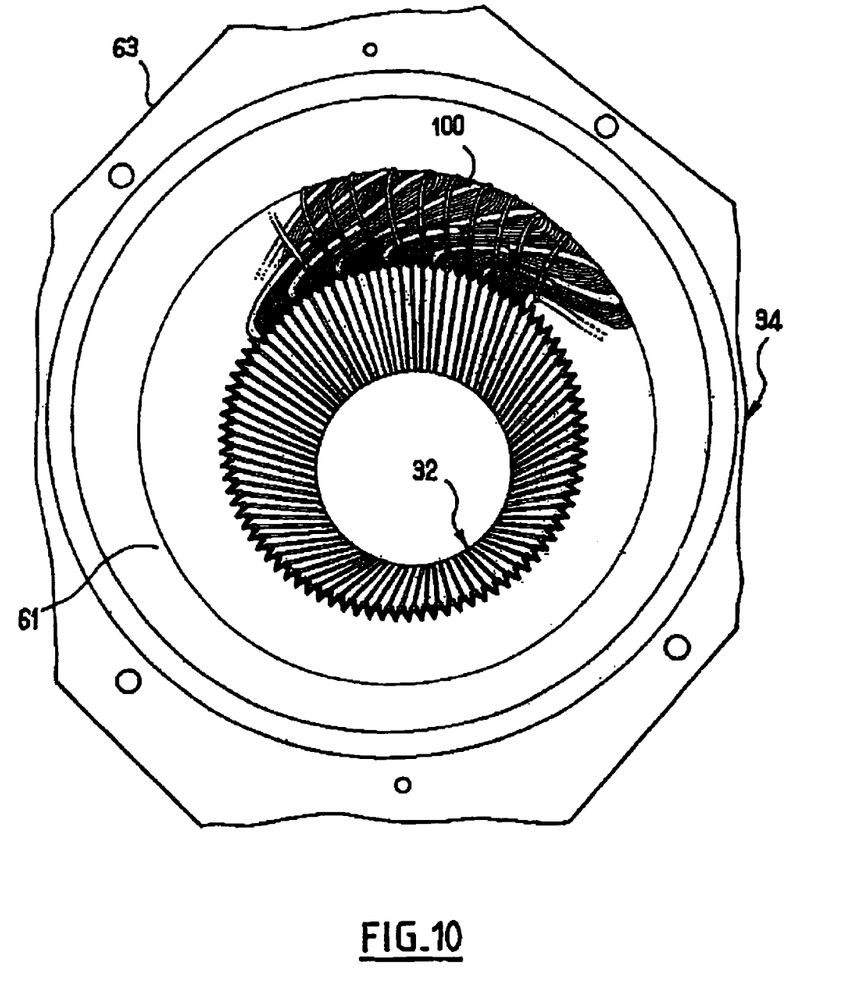
FIG. 10 is a diagram showing the disposition of the winding heads.

The heads 160 of the stator windings are generally triangular in shape, thus making it possible, as shown in FIG. 10, to place them inside the bodies 60 and 61 of the spacers 33 and 34 in such a as to avoid interfering with the rotor while it is being installed.

Figure 11:
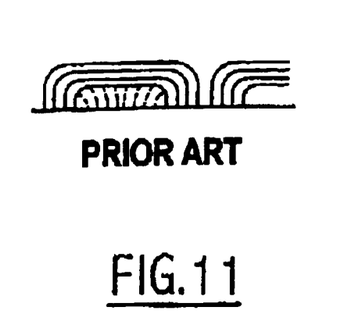
FIG. 11 is a highly diagrammatic representation of the general shape and disposition of the winding heads in the prior art.

In order to understand better what is meant by a winding head being "generally triangular" in shape, FIG. 11 is a developed view of the generally flat shape of winding heads in prior art machines, leading to the drawback of making it difficult to arrange wires in an annular space of small thickness, except by compacting them by exerting mechanical action on them of a kind that might damage their insulation.

Figure 12:
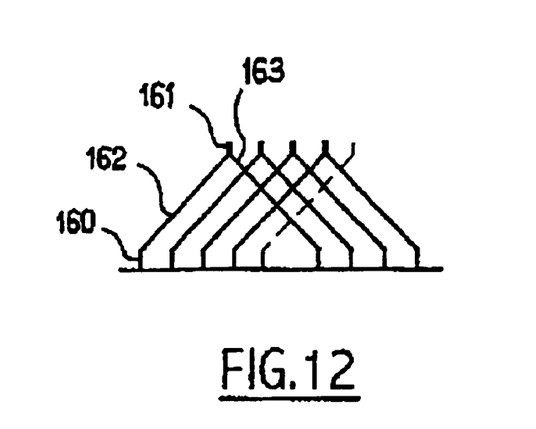
FIG. 12 is a highly diagrammatic representation of the generally triangular shape of the winding heads in an aspect of the invention.

FIG. 12 is highly diagrammatic, and shows the generally triangular shape of coil heads in an aspect of the invention. It can be seen that each coil head 160 presents portions 162 and 163 that extend obliquely over a relatively long distance going away from the stack of laminations and towards each other. These portions 162 and 163 meet at an end 161 so as to give the head 160 a shape that is generally triangular, when it is seen in a radial direction.

Naturally, the invention is not limited to the example described above and it is possible, in particular, to make the stack with internal channels, as described below with reference to FIG. 13.

Figure 13:
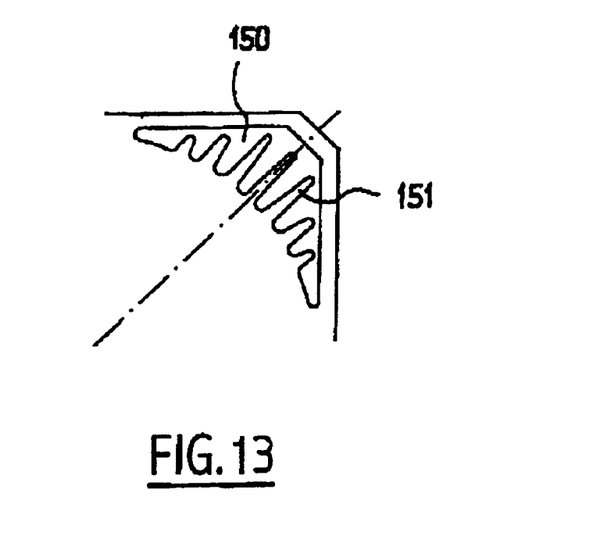
FIG. 13 is a fragmentary front view of a stack of stator laminations in a variant embodiment of the invention.

FIG. 13 shows a stack of stator laminations having at least one internal channel 150 made by cutting out the laminations constituting the stack.

This channel 150 can extend parallel to the axis of rotation X and it can enable the stator to be cooled by means of an axial flow of cooling air.

The laminations can be of a shape making it possible to avoid any need to fit a cover on the stack.

The fins 151 can be implemented by cutting out the metal sheets within the internal channel 150 in such a manner as to increase heat exchange.

Throughout the description, including in the claims, the term "comprising a" should be understood as being synonymous with "comprising at least one" unless specified to the contrary.

What is claimed is:

1. An electric machine with forced ventilation, the machine comprising:
   a rotor capable of rotating about an axis of rotation;
   a stator within which the rotor can rotate, said stator comprising:
      two spacers,
      bars interconnecting the two spacers
      a stack of laminations disposed between the spacers, the stack of laminations comprising slots,
      windings received in the slots;
   a fan;
      wherein the laminations are configured to form cooling channels in which a stream of cooling air generated by the fan can flow,
      wherein the laminations comprise a first plurality of laminations comprising extensions and grooves between the extensions where the bars pass, and
      wherein each spacer comprises a generally tubular body and a flange, the body having a first end adjacent to one end of the stack and a second end opposite to the first end fixed to the flange; and
   an external cover fixed to the flanges of the spacers.

2. A machine according to claim 1, wherein the fan is supported by the machine.

3. A machine according to claim 1, wherein the cooling channels are formed between fins and wherein the machine includes a cover covering the fins at least in part.

4. A machine according to claim 3, having two partitions extending substantially perpendicularly to the axis of rotation and placed inside the cover.

5. A machine according to claim 4, wherein the cover has two air inlets outside the partitions and an air outlet between the two partitions, the inlets and the outlet being situated on a top of the machine, the partitions being configured in such a manner as to constrain air to flow from the inlets towards the outlet via passages situated under the machine.

6. A machine according to claim 3, wherein the fins extend substantially perpendicularly to the axis of rotation.

7. A machine according to claim 3, wherein each fin comprises two to twelve laminations.

8. A machine according to claim 7, wherein each fin comprises five to nine laminations.

9. A machine according to claim 1, wherein the stack of laminations comprises alternating packets of laminations, each packet being made up of laminations that are identical in shape, with laminations of two consecutive packets being of different shapes.

10. A machine according to claim 9, wherein one of the packets comprises laminations having an outline that is substantially circular while an adjacent packet comprises laminations having additional extensions for forming fins.

11. A machine according to claim 1, wherein the bars are welded to the spacers.

12. A machine according to claim 1, wherein each spacer comprises the generally tubular body having the first end adjacent to the one end of the stack and the second end opposite to the first end adjacent to the flange welded to the body, the flange serving to fix a corresponding endplate.

13. A machine according to claim 1, wherein the stack includes at least one internal channel.

14. A machine according to claim 13, wherein the stack includes fins in the at least one internal channel.

15. A machine according to claim 1, wherein the fan is configured to rotate independently of the rotor.

16. A machine according to claim 1, wherein the grooves come into alignment with a circular outline of a second plurality of laminations.

17. A machine according to claim 1, wherein the spacers comprise generally cylindrical bodies having outside surfaces that are in alignment with bottoms of the grooves.

18. An electric machine with forced ventilation, comprising:
   a rotor capable of rotating about an axis of rotation;
   a stator within which the rotor can rotate, said stator comprising:
      two spacers,
      bars interconnecting the two spacers,
      a stack of laminations disposed between the spacers, the stack of laminations comprising slots,
      windings received in the slots; and
   a fan;
      wherein the laminations are configured to form cooling channels in which a stream of cooling air generated by the fan can flow,
      the machine further comprising partitions extending substantially perpendicularly to the axis of rotation and placed inside a cover,
      wherein the partitions are configured to constrain the flow of air to flow from at least one air inlet situated on top of the machine to at least one air outlet situated on top of the machine.

19. A machine according to claim 18, wherein the flow of air flows from two inlets to the one outlet, the two inlets being situated outside two partitions and the outlet between situated between the partitions, the flow of air flowing via passages situated under the machine.

20. An electric machine with forced ventilation, the machine comprising:
   a rotor capable of rotating about an axis of rotation;
   a stator within which the rotor can rotate, said stator comprising:
      two spacers, bars interconnecting the two spacers,
a stack of laminations disposed between the spacers, the stack of laminations comprising slots,
windings received in the slots; and
a fan;
wherein the laminations are configured to form cooling channels in which a stream of cooling air generated by the fan can flow,
wherein the windings have winding heads that are generally triangular in shape, comprising portions extending obliquely pulling away from the stack of laminations and toward each other, the portions meeting at an end and being made in one piece with each other.

* * * * *